April 9, 1957 W. F. KING 2,787,907
CRANKSHAFT BALANCING MACHINE
Filed March 18, 1954 3 Sheets-Sheet 1

INVENTOR
William F. King
BY L. D. Buell
ATTORNEY

April 9, 1957 W. F. KING 2,787,907
CRANKSHAFT BALANCING MACHINE
Filed March 18, 1954 3 Sheets-Sheet 2

INVENTOR
William F. King
BY
L. D. Busch
ATTORNEY

April 9, 1957 W. F. KING 2,787,907
CRANKSHAFT BALANCING MACHINE
Filed March 18, 1954 3 Sheets-Sheet 3

INVENTOR
William F. King
BY
L. D. Busch
ATTORNEY

United States Patent Office 2,787,907
Patented Apr. 9, 1957

2,787,907

CRANKSHAFT BALANCING MACHINE

William F. King, Oak Park, Mich., assignor to General Motors Corporation, Detroit, Mich., a corporation of Delaware Application March 18, 1954, Serial No. 417,039

9 Claims. (Cl. 73—462)

This invention relates to balancing machines of a type particularly adapted for automatically effecting unbalance determinations in elongated rotating bodies such as crankshafts and the like.

The invention is specially suited for use in a balancing installation in which engine crankshafts are initially "rough-balanced" prior to assembly in an engine, and thereafter are "finish or assembly-balanced" in the engine to correct for any unbalance remaining in the shaft and for such additional unbalance as may be contributed thereto by other components of the engine.

In such a balancing system, it is desirable to perform the rough balancing correction for any particular transaxial plane of correction at two predetermined points angularly spaced, say 90 degrees, apart on the counterweight portion of a crank cheek containing the plane of correction, thereby to provide a clear unobstructed sector between these two fixed points on the counterweight in which the finish-balance correction may be performed. Where the balance correction is effected by removal of metal from the crankshaft, as by an associated drilling organization, the foregoing balancing procedure avoids unbalance correction difficulties that are presented when the angular location of the total rough unbalance and the finish or assembly unbalance nearly coincide. Furthermore, less stressing of the crankshaft is encountered since the unbalance compensation is performed at several distributed points where a lesser amount of metal is removed than if the compensation were performed at but a single point as is done in prior balancing practices.

The invention is further characterized by being entirely automatic in operation, and in distinction to prior balancing machines and organizations, does not require any manual adjustment nor reading of controls or instruments by an operator to effect a determination of the unbalance in the crankshaft.

Accordingly, the invention has for its general object to provide apparatus in accordance with the above end, more specifically, an automatic balancing installation in which the total unbalance for any particular plane of correction is automatically resolved into two angularly spaced components at fixed locations on the workpiece and in which the balance correction may be performed at such locations automatically without human intervention.

Figure 1:
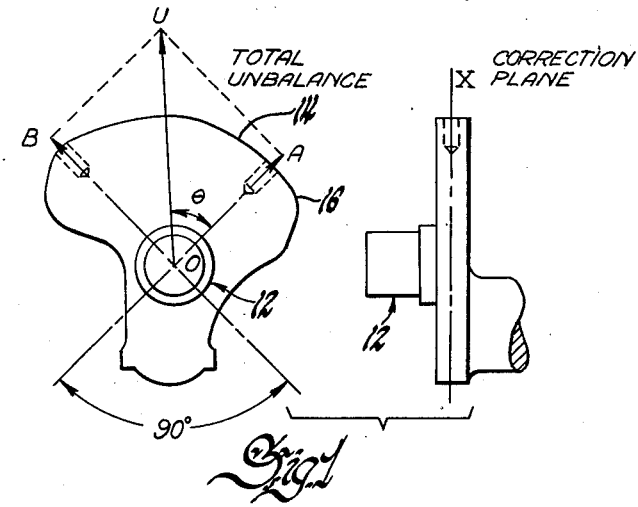
Fig. 1 illustrates a portion of a crankshaft to be balanced in accordance with the present invention.

Referring to the drawings, Fig. 1 illustrates one end of a V-8 crankshaft 12 with a transaxial plane, labelled X, in which an unbalance correction is to be performed. This end of the crankshaft is to be placed in balance by drilling holes at A and B, which are spaced 90 degrees apart on the counterweight portion 14 of a crank cheek 16 containing the correction plane. The present invention automatically determines the depth of hole to be drilled at each of these locations.

Figure 2:
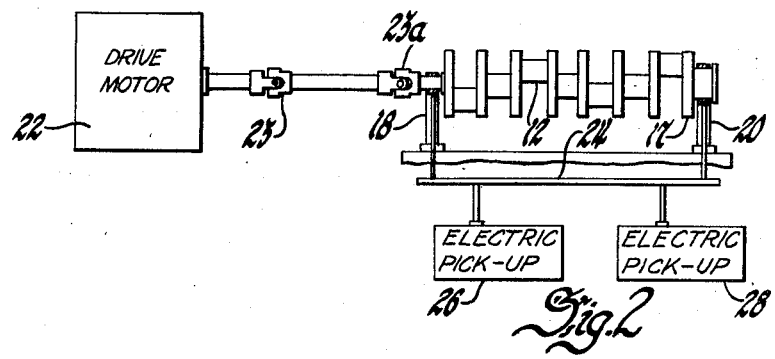
Fig. 2 is a part of a balancing machine in accordance with the present invention.

Fig. 2 illustrates the crankshaft 12 installed in a balancing arrangement employed in the present invention and includes a mounting fixture in the form of resilient or oscillatable journal supports 18, 20 that permit vibration of both ends of the crankshaft in an axial plane thereof; a constant speed drive motor 22 flexibly coupled to the shaft through a pair of spaced universal joints 23, 23a and rotating the shaft about its axis; a mechanical nodal bar 24 suitably coupled to the shaft supports so as to oscillate in synchronism with the shaft; and a pair of vibration pick-up devices 26, 28 mounted at the nodal points of the nodal bar for indicating the unbalance in the end counterweights 16 and 17 of the shaft.

No attempt has been made to show any particular construction of mounting supports for the shaft and nodal bar, the drawings being, for the most part, of a diagrammatic nature to bring out principles of operation rather than particular details of construction. One such manner in which the crankshaft may be mounted and coupled to the driving motor is illustrated and described in U. S. Patent 2,293,371 in the name of T. C. Van Degrift assigned to the present assignee. Reference also is made to the above patent for a description of the construction and theory of operation of the nodal bar 24. The nodal bar is mounted in an axial plane normal to the plane of the shaft supports and is illustrated in the position shown in Fig. 2 only for convenience of the drawings.

The vibration pick-ups 26 and 28 are conventional electromagnetic devices each of which generates an alternating current voltage proportional to the velocity of the oscillatory vibrations appearing at respective ones of the aforementioned nodal points. The alternating current signal from each of the pick-up devices has a frequency equal to the rotational speed of the crankshaft and an amplitude proportional to the total unbalance component OU of Fig. 1. The pickup voltage OU from one of the pickup devices is shown in Fig. 3 both vectorially and as voltage vs. time, along with the quadrature or conjugately related components OA and OB thereof representing the magnitude of the unbalances which are to be drilled out at the locations A and B, respectively, of Fig. 1.

Figure 3:
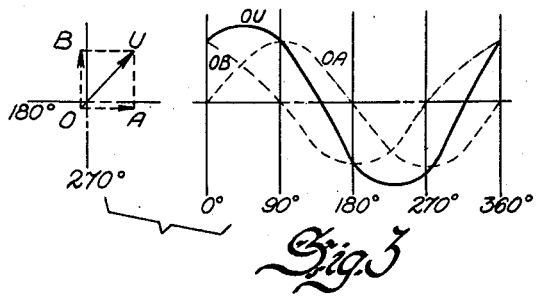
Figs. 3, 4, 5, 8a and 8b are curves that are useful in explaining the present invention.
Figure 4:
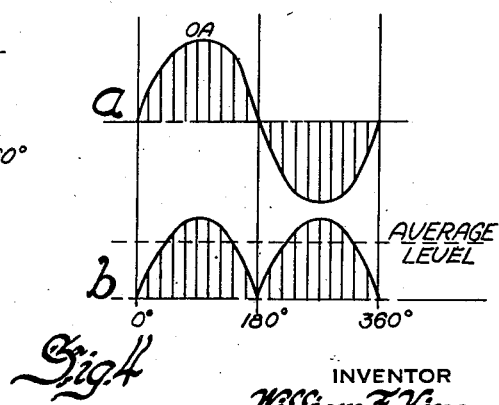

If the component OA of Fig. 3 is treated as shown on Fig. 4; that is, if the negative pulses or alternations appearing in the second half cycle from 180 to 360 degrees are commutated or reversed in direction, as shown in Fig. 4b, a pulsating unidirectional voltage will be obtained which has an average voltage of 63.7% of the peak value of the component OA.

Figure 5:
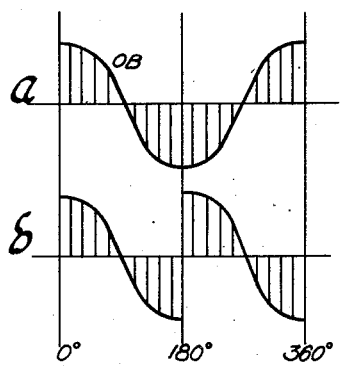

Under the same conditions of commutation, the component OB of Fig. 3 would be treated as shown on Fig. 5, that portion of the component appearing in the interval from 0 to 180 degrees would be unchanged and the second half would be reversed in phase, as shown in Fig. 5b, resulting in a fluctuating voltage with an average value of zero.

Thus, a commutation which passes the interval from 0 to 180 degrees unchanged and which passes the interval from 180 to 360 degrees with the phase reversed would yield a voltage whose average level would be equal to 63.7% the peak value of the component OA and affords an effective mechanical method of separating and measuring the magnitude of this component of the total unbalance voltage OU. The OB component can be separated by a similar commutation process in which the commutation is simultaneously performed 90 electrical degrees in advance of or behind the commutation of the OA component.

Figure 6:
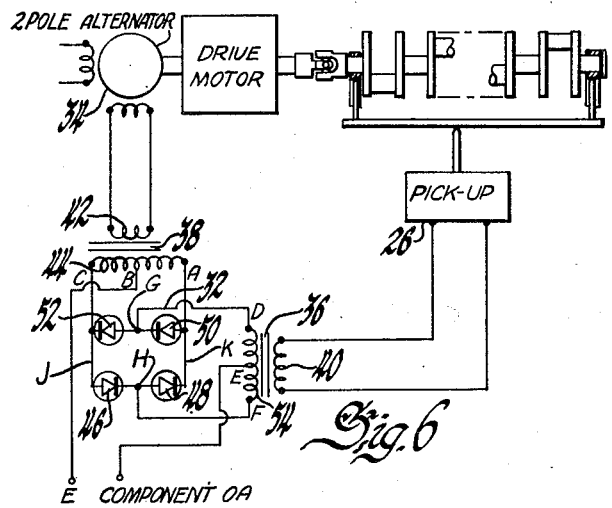
Fig. 6 shows schematic electrical diagram of a part of the apparatus of the present invention installed in the balancing machine of Fig. 2.

The aforementioned commutation can be performed electrically with a phase sensitive switching circuit which includes a phase sensitive rectifier bridge 32 and a small two-phase alternator 34 driven by the drive motor in synchronism with the crankshaft, as shown in Fig. 6. The bridge 32 includes a pair of input transformers 36, 38 the primary windings 40 and 42 of which respectively are connected to receive the unbalance signal from a pickup device, as 26, and a reference signal from one of the phase windings of the alternator 34. The end terminals A, C of the secondary winding 44 of the reference signal transformer 38 are connected to the diagonal terminals J, K of an arranagement of dry-type rectifiers 46, 48, 50 and 52 serially connected to form the bridge circuit proper with each of the rectifiers forming an arm of the bridge. The end terminals D, F of the secondary winding 54 of the unbalance signal transformer 36 are connected to the conjugate terminals G, H of the rectifier bridge proper. The secondaries of the input transformers are center-tapped as shown at B and E and constitute the output of the phase-sensitive circuit, the operation of which is explained below.

Figure 7:
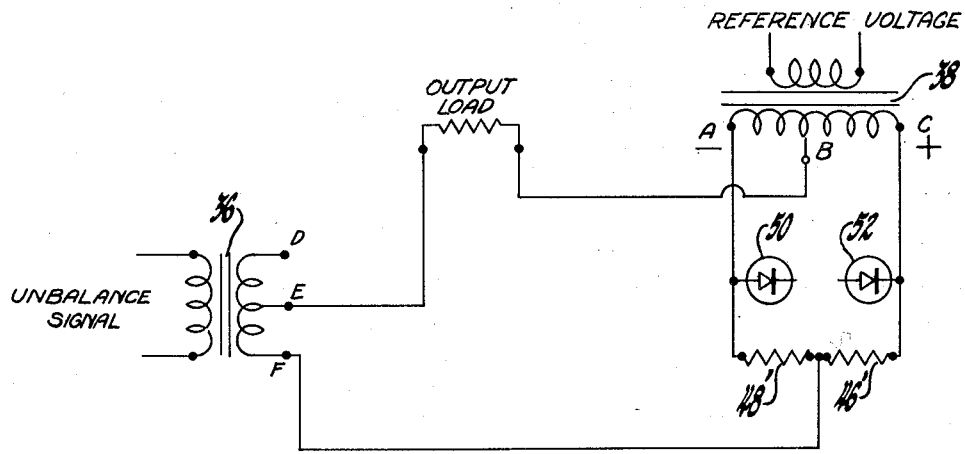
Figs. 7 and 8 are schematic electrical diagrams which are useful in understanding the operation of the apparatus of Fig. 6.
Figure 8:
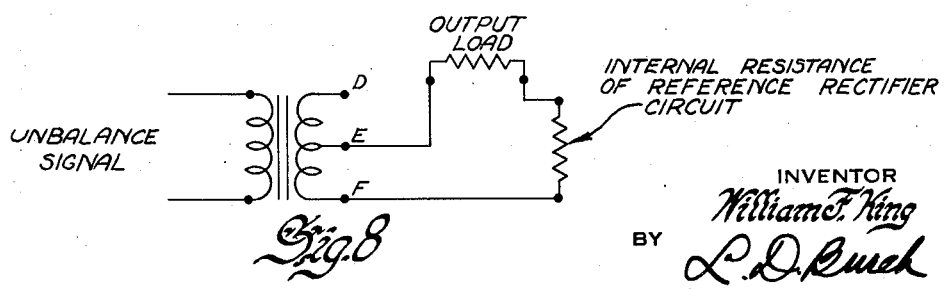

During one-half cycle of the reference voltage the conditions shown on Figure 7 will prevail. Secondary terminal A of the reference voltage transformer 38 will be of negative polarity and terminal C will be positive. Rectifiers 50 and 52 will not conduct with this polarity and will act like an open circuit. However, current will flow thru the rectifiers 46 and 48. These latter rectifiers will then act as resistances 46', 48', which will be equal if matched rectifiers are used. Since terminal B is a center tap on the transformer 38 and bridge point H is between two equal resistances across the transformer, points B and H are of equal potential. Any voltage introduced between these points will cause current to flow. During this half cycle the output load and the terminals E and F of the unbalance signal transformer 36 are in series between the equipotential points B and H. Thus the output load is effectively connected across the terminals E and F with the internal impedance of the reference signal rectifier circuit in series. The effective condition for this reference half cycle is shown on Figure 8.

During the next half cycle of the reference voltage the output load will be connected across the unbalance signal transformer terminals D and E by the rectifiers 50 and 52 in the same manner.

Figure 8A:
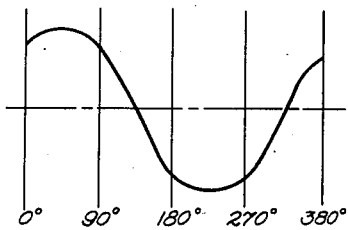
Figure 8B:
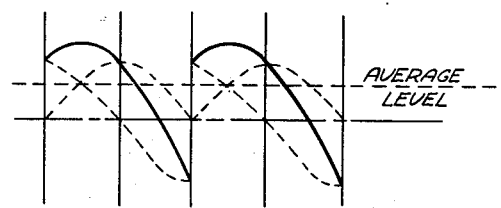
Figure 9:
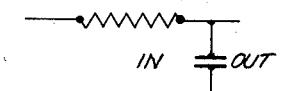
Figs. 9, 9a, 9b and 9c are alternative circuits of another part of the apparatus of the present invention.
Figure 9A:
Figure 9B:
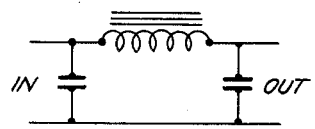
Figure 9C:
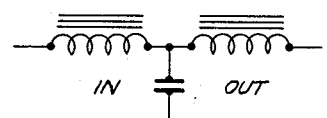

If such a passive commutator circuit is used with a reference signal generator added to the balancing machine of Figure 2 as shown in Figure 6 the signal output of the vibration pickup shown in Figure 8a will be commutated to yield the output sketched on Figure 8b. This commutated output will be a fluctuation voltage having an average value proportional to one of the components of unbalance to be drilled out of the #1 counterweight. In like manner, to be described presently with reference to Figure 10, the component OB may be obtained using a second phase sensitive bridge circuit and a second winding of the alternator phased 90° relative to the winding used to obtain the component OA. The components of unbalance in a correction plane at the other end of the crankshaft may be obtained with a similar two-phase alternator each of the quadrature related windings of which is associated with a separate phase sensitive bridge circuit.

It may be necessary to reduce the fluctuations of the average level of the commutated components, as the component OA of Fig. 8b for example, in order to use the commutated signal in an automatic positioning system. This may be accomplished by means of a low pass filter 66, various forms of which are shown in Figs. 9, 9a, 9b and 9c, all commonly used and described in detail in standard electrical engineering texts. The objectionable ripple may be reduced to a tolerable level, leaving a substantially constant D. C. voltage which may be used to control the automatic correction setting equipment.

Figure 10:
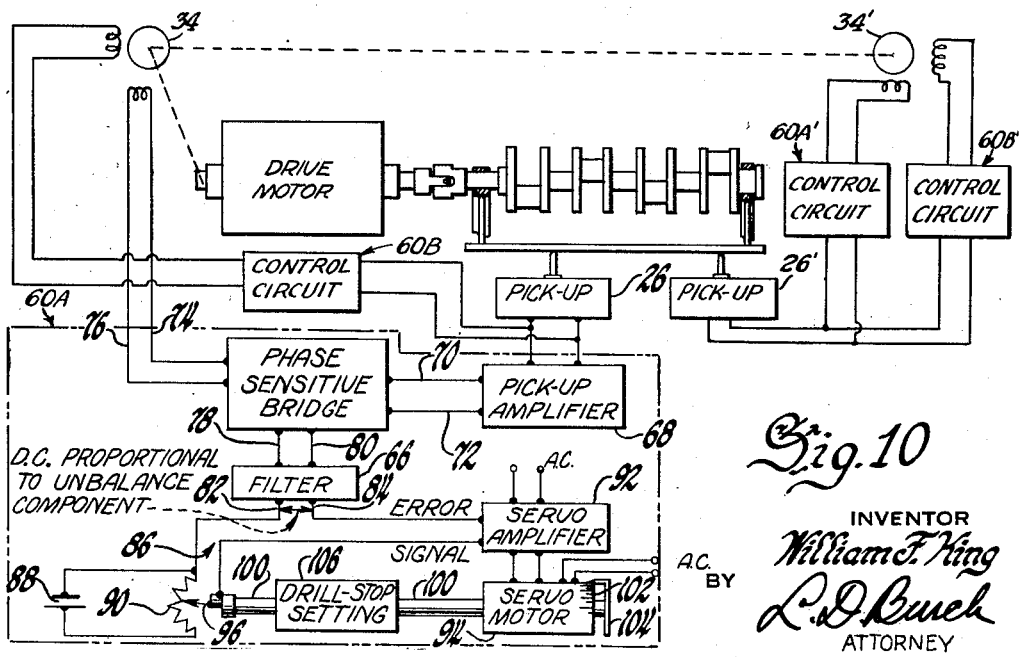
Fig. 10 is a schematic and block diagrammatic showing of balancing apparatus in accordance with the present invention.

An automatic balancing system based on the foregoing is shown in Fig. 10 and employs a control circuit 60A which includes a self-balancing adjustable amplitude comparison circuit operating on the closed-loop servo principle for automatically indicating an unbalance quantity and positioning an adjustable drill stop setting to effect exact compensation for the amount of unbalance at a correction location corresponding, for example, to the component OA. The output of the pickup device 26 is amplified in an amplifier 68 and applied over conductors 70, 72 to the primary terminals of the unbalance signal input transformer 36 connected to one set of input terminals of the phase sensitive bridge 32 the other set of input terminals of which are connected to receive the output from one of the windings of the alternator 34 over conductors 74, 76. The output of the bridge circuit is applied to the input of the ripple filter 66 over conductors 78, 80. The filter output representing the commutated unbalance signal is connected over conductors 82, 84 in circuit with the amplitude comparison circuit 86, which comprises a standard source of cell 88 with an associated adjustable potentiometer 90, and a conventional servo amplifier 92 with an associated two-phase servo motor 94. The D. C. unbalance signal from the filter 66 is supplied to the amplitude comparison circuit in such manner as to be opposed by or differentially combined with a portion of the standard source appearing between conductor 82 and the adjustable arm 96 of the potentiometer 90, and the resultant difference or error signal is applied to the input of the servo-amplifier. The servo amplifier 92 is powered from a local source of alternating current and supplies an alternating current signal to the control winding of the servo motor 94, the reference or other phase winding of which is energized from the local source of alternating current. The control signal from the output of the servo-amplifier corresponds in phase and magnitude to the relative polarity and magnitude of the error signal and controls the servomotor, the rotor shaft 100 of which is operatively connected to the arm 96 of the comparison signal potentiometer 90, to rotate in such direction and an amount as will reduce the error signal to zero, at which point the system will be balanced and the motor or translating device will cease moving.

In a similar manner the other component of unbalance OB is obtained and corrected by the provision of a control circuit 60B, which may be identical to circuit 60A. The components of unbalance in a correction plane at the other end of the crankshaft are obtained and corrected by provision of equipment identical to that just described and including an alternator 34', a pick up 26', and control circuits 60A' and 60B'.

An indicating arrangement in the form of a graduated indicator dial 102 on, say, the stator casing of the servomotor and a pointer 104 carried by the rotor shaft may be employed to indicate the amount of unbalance at one of the aforementioned predetermined points lying in the selected correction plane.

The servo-motor shaft can be coupled directly to the potentiometer arm or additionally could be operatively connected to drive a suitable drill stop setting mechanism 106, which in its simplest form could be merely an adjustable stop on a conventional drilling organization associated with the balancing apparatus of the invention. Where the drilling organization is separate and removed from the balancing installation, a telemetering system between the balancing machine and remote drilling machine could be employed. The telemetering system may employ a self-synchronous transmitter located device at the balancing station and connected to the shaft of the servo-motor 94 to be positioned thereby and a self-synchronous receiver device located at the drilling station and electrically connected to the transmitter device to follow the movement thereof and position the drill stop setting 106 on the driller.

I claim:

1. Apparatus for automatically resolving the total unbalance in a transaxial plane of a rotating body into a pair of radially directed components extending through a pair of fixed points spaced 90 degrees apart on said body, said apparatus comprising the combination of means supporting said body for rotation about its axis, means rotating said body about its axis, vibration pickup means responsive to vibrations induced by unbalance in said body and developing a periodically varying electrical signal having characteristics related to the unbalance in said body, a two-phase alternator driven by said rotating means in synchronism with said body and having a pair of quadrature related phase windings each providing a reference signal therefrom, a pair of phase sensitive rectifier bridges each having two pairs of input terminals and one pair of output terminals, one of the pairs of input terminals of each of said bridges being connected to receive the said unbalance signal from said vibration pickup means and the other pair being connected to receive the output from a respective one of said windings of said alternator, and separate circuit utilizing means connected to the output terminals of each of said phase sensitive rectifier bridges providing an indication of the magnitude of unbalance at respective ones of said points on said body.

2. Apparatus in accordance with claim 1 above wherein said utilizing means includes adjustable circuit means for comparing the amplitude of the output signal from a respective one of said phase sensitive rectifier bridges with a comparison signal derived from a reference standard source of potential contained in said comparison circuit means and translating means actuated by the difference signal between said phase sensitive rectifier output signal and said comparison signal and operatively connected with said adjustable circuit means for reducing said difference signal to zero.

3. Apparatus in accordance with claim 1 above wherein said utilizing means includes adjustable circuit means for comparing the amplitude of the output signal from a respective one of said phase sensitive rectifier bridges with a comparison signal derived from a reference source of potential contained in said comparison circuit means, translating means actuated by the difference signal between said phase sensitive rectifier output signal and said comparison signal and operatively connected with said adjustable circuit means for reducing said difference to zero, and an indicating dial and pointer on said translating means indicating the magnitude of unbalance at a respectively associated one of said points.

4. Apparatus in accordance with claim 1 above wherein said utilizing means includes adjustable circuit means for comparing the amplitude of the phase sensitive rectifier output signal from a respective one of said phase sensitive bridges with a comparison signal derived from a reference source of potential contained in said comparison circuit means, translating means actuated by the difference signal between said output signal and said comparison signal and operatively connected with said adjustable circuit means for reducing said difference signal to zero, and positionable means operatively connected for movement by said translating means an amount corresponding to the magnitude of the unbalance at an associated one of said points on said body.

5. Apparatus for automatically resolving the total unbalance in a transaxial plane of a rotating body into a pair of radially directed components extending through a pair of fixed points spaced 90 degrees apart on said body, said apparatus comprising, in combination, means supporting said body for rotation about its axis, means rotating said body about its axis, electrical vibration pickup means responsive to vibrations of said body induced by unbalance therein, a two-phase alternator driven by said rotating means in synchronism with said body and having a pair of quadrature related phase windings each providing a reference signal therefrom, a pair of phase sensitive rectifier bridges each having two pairs of input terminals and one pair of output terminals, one of the pairs of input terminals of each of said bridges being connected in circuit with said vibration pickup means and simultaneously receiving the output thereof, the other of the pairs of input terminals of each of said bridges being connected in circuit with a respective one of said phase windings, and adjustable amplitude comparison balancing circuit connected with each of said phase sensitive rectifier bridges, a servo-motor controlled from said adjustable amplitude comparison circuit and operatively connected for effecting balance thereof, and positionable means actuated by said servo-motor an amount corresponding to the unbalance at an associated one of said points on said body.

6. Apparatus for automatically separating and resolving the unbalance ascribable to a particular plane of correction of an elongated rotating body into a pair of components representative of said unbalance at a pair of fixed points spaced 90 degrees apart on said body in said correction plane, said apparatus comprising, in combination, means supporting said body for rotation about its axis, means rotating said body about its axis, a nodal bar extending longitudinally of said body and operatively connected to said supporting means, vibration pickup means mounted at a nodal point of said nodal bar and developing a periodically varying signal having characteristiscs related to the total unbalance in said selected correction plane, a two-phase alternator driven by said rotating means in synchronism with said body and having a pair of quadrature related phase windings each providing a reference signal therefrom, a pair of phase sensitive rectifier bridges each having two pairs of input terminals and one pair of output terminals, one of the pairs of input terminals of each of said bridges being connected to receive simultaneously the said unbalance signal from said vibration pickup means and the other pair being connected to receive the output from a respective one of said windings of said alternator, and separate circuit utilizing means connected to the output terminals of each of said phase sensitive rectifier bridges providing an indication of the magnitude of unbalance at respective ones of said points on said body.

7. Apparatus for automatically determining the magnitude of unbalance at each of a pair of angularly spaced fixed points in each of a pair of axially spaced selected planes of correction through an elongated rotating body, said apparatus comprising, in combination, means supporting said body for rotation about its axis, means rotating said body about its axis, a nodal bar extending longitudinally of said body and operatively connected to said supporting means, a pair of electrical vibration pickup means mounted at opposite nodal points of said nodal bar, a pair of phase sensitive rectifier means for each of said vibration pickup means and connected to receive the unbalance pickup signal from the vibration pickup means associated therewith, a pair of polyphase alternator means each having a pair of windings spaced apart by an electrical angle corresponding to the angle between said fixed points in a correction plane, each of said alternator means being driven by said rotating means and developing a pair of reference signals each supplied to a different one of said phase sensitive rectifier means associated with a respective one of said vibration pickup means, and an adjustable amplitude comparison balancing circuit connected with each of said phase sensitive rectifier means including a comparison standard source of potential and a servo-motor controlled from said adjustable comparison circuit and operatively connected to effect balance thereof.

8. Apparatus for automatically determining the magnitude of unbalance at each of a pair of angularly spaced fixed points in a selected transaxial plane of correction through a rotating body, said apparatus comprising, in combination, means supporting said body for rotation about its axis, means rotating said body about its axis, electrical vibration pickup means responsive to vibrations of said body induced by unbalance therein, a pair of phase sensitive rectifier bridge means each connected to receive the unbalance pickup signal from said vibration pickup means, polyphase alternator means having a pair of windings spaced apart by an electrical angle corresponding to that between said fixed points, said alternator means being driven by said rotating means and developing a pair of reference signals each supplied to a different one of said phase sensitive rectifier bridge means, and an adjustable amplitude comparison balancing circuit connected with each of said phase sensitive rectifier bridge means including a comparison standard source of potential and a servo motor controlled from said adjustable comparison circuit and operatively connected to effect balance thereof.

9. Apparatus for automatically determining the magnitude of unbalance at each of a pair of angularly spaced fixed points in each of a pair of axially spaced selected planes of correction through an elongated rotating body said apparatus comprising, in combination, means supporting said body for rotation about its axis, means rotating said body about its axis, a pair of electrical vibration pickup means responsive to vibrations of said body induced by unbalance therein, a pair of phase sensitive rectifier means for each of said vibration pickup means connected to receive an unbalance pickup signal from the vibration pickup means associated therewith, a pair of polyphase alternator means each having a pair of windings spaced apart by an electrical angle corresponding to that between said fixed points in a correction plane, each of said alternator means being driven by said rotating means and developing a pair of reference signals supplied to a different one of said phase sensitive rectifier means associated with a respective one of said vibration pickup means, an adjustable amplitude comparison balancing circuit connected with each of said phase sensitive rectifier means including a reference source of potential and a servo-motor controlled from said adjustable comparison circuit and operatively connected to effect balance thereof.

References Cited in the file of this patent

UNITED STATES PATENTS

| | | |
|---|---|---|
| 2,243,379 | Johnson | May 27, 1941 |
| 2,363,373 | Werner | Nov. 21, 1944 |

FOREIGN PATENTS

| | | |
|---|---|---|
| 642,916 | Great Britain | Sept. 13, 1950 |